UNITED STATES PATENT OFFICE.

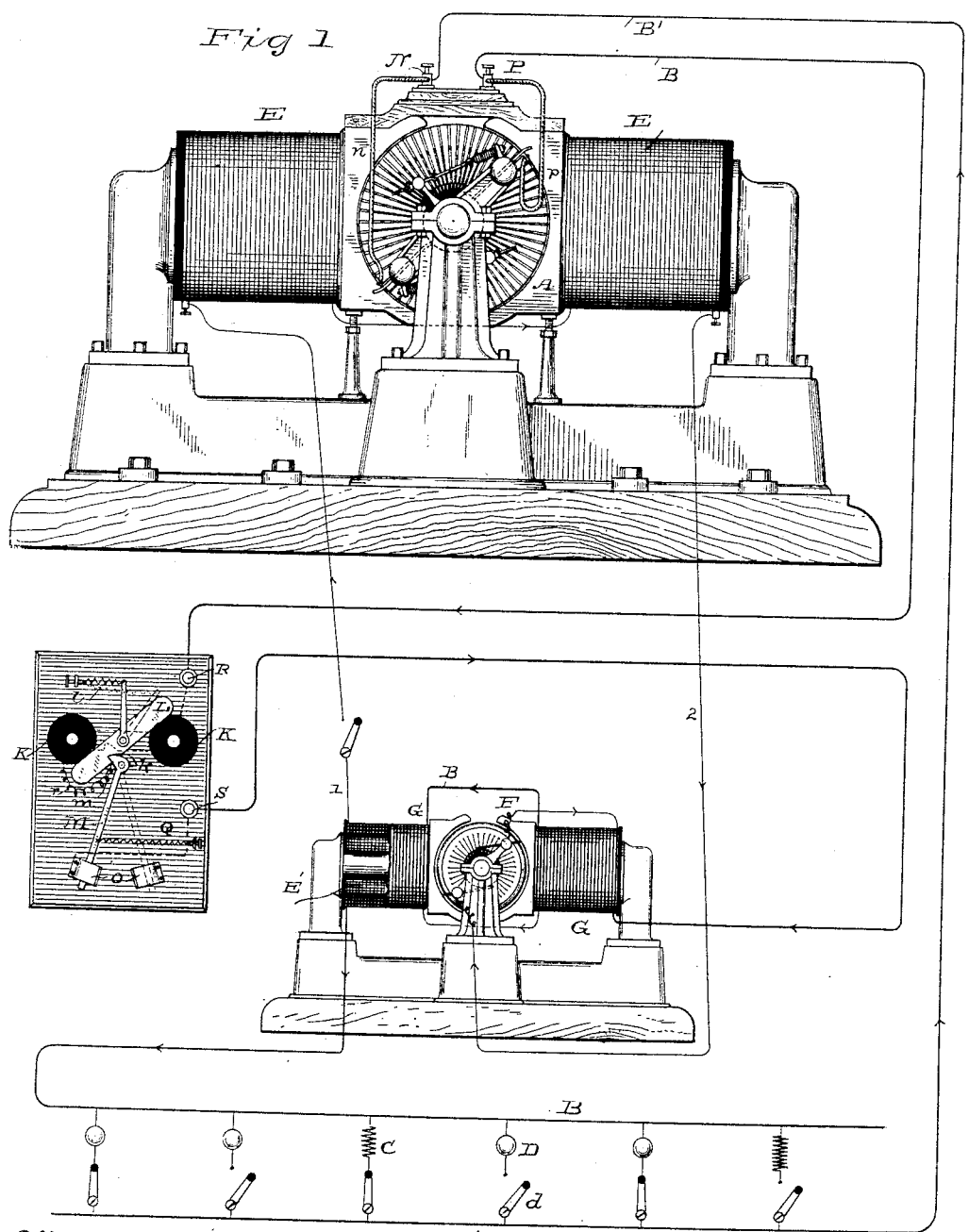

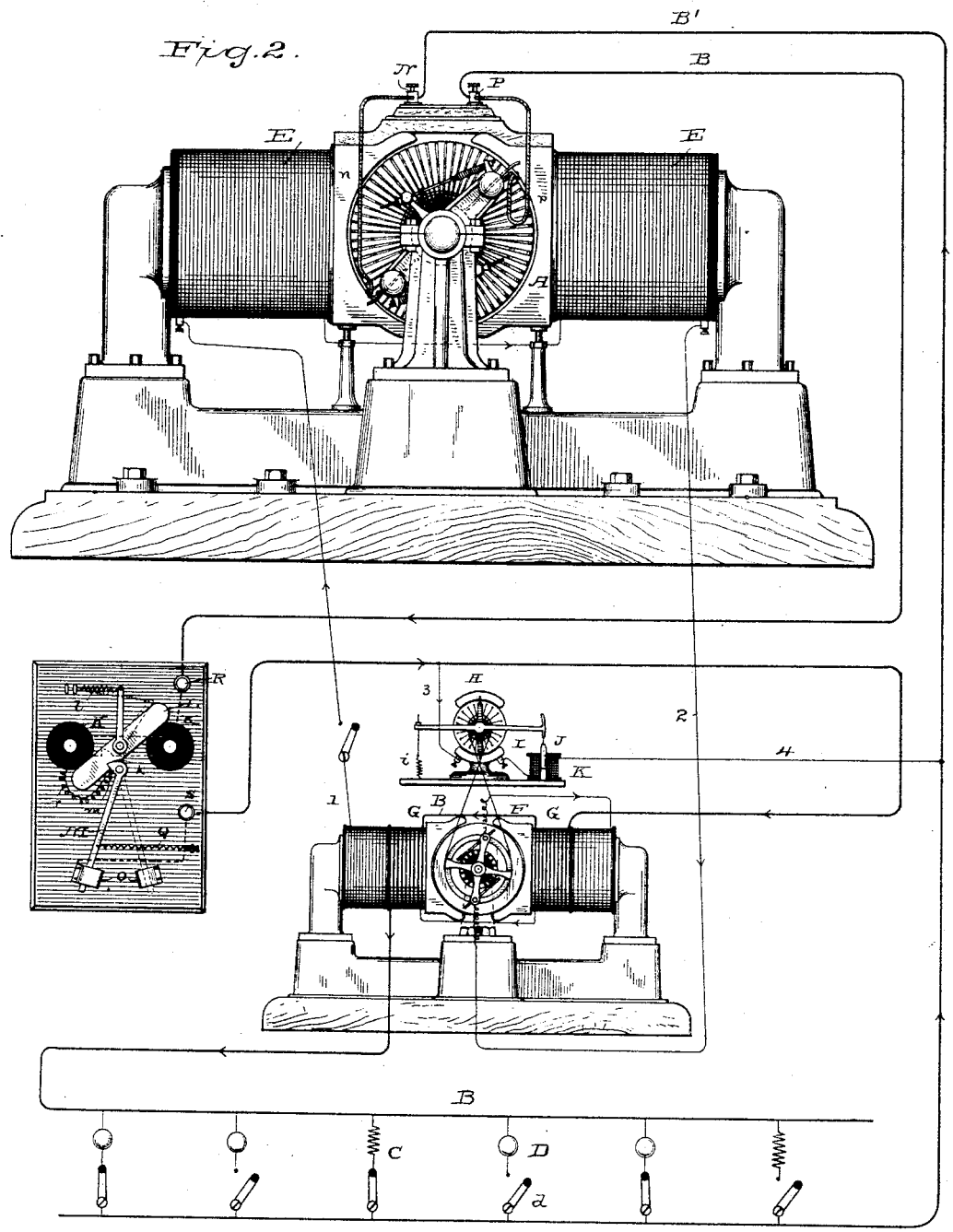

CHARLES J. VAN DEPOELE, OF CHICAGO, ILLINOIS.

ELECTRIC GENERATOR.

SPECIFICATION forming part of Letters Patent No. 470,521, dated March 8, 1892.

Application filed May 13, 1887. Serial No. 238,050. (No model.)

*To all whom it may concern:*

Be it known that I, CHARLES J. VAN DEPOELE, a citizen of the United States, residing at Chicago, in the county of Cook, State of Illinois, have invented certain new and useful Improvements in Systems of Generating Electric Currents of Constant Potential, of which the following is a description.

My invention relates to improvements in systems of generating electric currents of constant potential, and, while the improvements are applicable wherever it is desired to maintain a constant or substantially constant potential in a working circuit supplying a varying number of translating devices, I will describe it as applied particularly to the operation of a circuit including a varying number of electric motors, the said motors being, for still further purposes of illustration, supposed to be arranged to propel the cars of an electric-railway system and the conductors of said system to be arranged in multiple arc.

In a previous application filed by me March 12, 1887, Serial No. 230,646, I have described and illustrated a constant-potential system in which the field-magnets of the main generator are separately excited by a smaller machine wound in series, the commutator-brushes of the exciter being controlled and its production and output of current increased or diminished by a small motor, the movement and direction of movement of which is controlled by a solenoid in a shunt between the main conductors, so that whenever a considerable fall of potential occurs by reason of the cutting into circuit of a large amount of work at one time the brushes of the exciter will be moved to their more effective position, and by increasing the magnetism of the field-magnets of the generator cause a corresponding increase of the quantity of current produced and sent to the working circuit.

By my present invention the arrangement of main generator, working circuit, automatic cut-out, and exciter remain as above referred to; but I find that I can so proportion the series winding of the field-magnets of the exciter that its current will be just sufficient to produce that degree of magnetism in the field-magnets of the main generator as will cause its armature to produce current of the desired electro-motive force when little or no current is being consumed in the working circuit, and that by superposing upon said series winding a few layers (more or less) of larger (working circuit) conductors, winding them thereon in such direction that as current flows therethrough to the translating devices in the working circuit their effect will be to add to the magnetizing power of the series coils, and so increase the amount of current produced by the exciter and sent to the field-magnets of the main generator in substantially the same ratio as the demands of the external circuit upon the armature of the main generator. The main current passing through the additional coils on the field-magnets of the exciter will cause it to instantly and automatically increase or decrease its output of current, and thereby strengthen or weaken the magnetism of the field-magnets of the main generator above the initial, enabling it to respond to increased demand without delay or difficulty. In this manner a perfectly automatic and self-regulating combination of generator and exciter is produced, requiring neither adjustment of brushes nor other regulating devices of any kind whatever.

In cases where it is necessary or convenient to use as an exciter a generator not properly proportioned for normal magnetization of the field-coils of the main generator I contemplate using the solenoid and brush-shifting motor, as described in my said former application, the additional coils of working-circuit conductor being placed upon the field-magnet coils of the exciter for the purpose just explained, and the regulator being used in addition thereto in order to compensate for any imperfection in the structure and proportions of the apparatus.

The details of arrangement of my system above referred to will be hereinafter fully set forth.

In the accompanying drawings, Figure 1 is a diagrammatic representation of the several parts, the generator, cut-out, and exciter being shown in elevation, the latter partly in section, and the exterior working circuit in diagram. Fig. 2 is a diagrammatic representation of a modification of my system, the generator, exciter, regulating-motor, and cut-out being shown in elevation and the exterior working circuit in diagram.

A is the armature of the main generator, and B B' are the conductors of the exterior working circuit, into which said armature feeds through binding-posts P and N, which are directly connected through short conductors $p$ $n$ with the positive and negative commutator-brushes, respectively. Translating devices—such as electric motors, incandescent lamps, &c.—are shown conventionally at C and D in multiple arc between the main conductors. They are further provided with suitable switches $d$, by which they may be cut in and out of circuit, as desired.

E E are the field-magnets of the main generator, and F is a smaller generator provided with main field-magnet coils E' of suitable resistance wound and connected in series with the armature and having their terminals connected to the circuit-wires 1 and 2, which extend to and include the coils of the field-magnets E E of the main generator, the said exciter feeding continuously and directly into the described circuit, and being so proportioned that the normal current of the machine—that is, that produced by the series of field-coils and armature—will produce the normal difference of potential between the commutator-brushes of the main armature A.

In order to provide for a sudden increase of the amount of current produced by the main generator to supply the varying demands of the working circuit whenever, as is apt to be the case with electric railways, a number of motors are put into circuit at once, I add to the ordinary or series winding of the field-magnets of the exciting-generator a few coils or layers of the conductor of the working circuit, which is shown as large wire G. These coils are arranged to produce an effect similar and additional to that of the other (the series) coils upon the field-magnets of the exciter, so that whenever more current flows through the main circuit to supply an increased demand from the translating devices its first effect will be to increase the strength of the field-magnets of the exciter, and by so doing cause it to send more current to the field-magnets of the main generator, which in response will then immediately send more current to line, and so keep the electro-motive force constant.

In cases where it is convenient or necessary to use as an exciter a generator not specially built or designed for the above purpose, the desired results would be secured by applying thereto the motor-regulator described in my said previous application, in which modified arrangement I use an electric motor H, the armature of which is connected by a belt or worm-gear or any other convenient mechanical device to the commutator-brush carrier of the exciter F, so that when rotated in either direction it will raise or lower the commutator-brushes of the exciter, moving them toward or away from the line of commutation, and thereby cause the machine to produce more or less current. The commutator-brushes of the motor are connected to a pivoted lever I, connected at one end to an adjustable tension-spring $i$ and at the other to the core J of a solenoid K, the motor and solenoid being connected in derivation from the main line through conductors 3 4, and being so connected will be effected by any variation in its potential and will at once be brought into action to compensate its own discrepancies to the extent of its jurisdiction without materially affecting the operation of the additional coils G, which has been previously described in connection with the coils E'.

In order to prevent injury to any of the parts from the too sudden switching-in of all the translating devices and the possible short-circuiting of the generator, I provide a safety cut-out, preferably placed in proximity to the generator and consisting of the electro-magnets K, provided with a swinging or pivoted armature L, normally held away from the poles of the said magnets by an adjustable tension-spring $l$. The armature L is formed with a notch $k$, into which fits a projection or lug $m$, extending from the pivoted contact-lever M, arranged in proximity thereto, so that when the armature L is in its normal position the projection on the lever M will engage and be held in the notch $k$ in the armature, and when in this position the free end of the lever M is in electrical connection with and completes the main circuit through a contact-spring O, from which the lever M is pulled by means of an adjustable tension-spring Q whenever its projection $m$ is released from its keeper, the armature L.

The main circuit enters the cut-out by positive conductor B, which enters through binding-post R, passing thence to and including the coils of the magnets K, thence by conductor $r$ to the lever M, and from contact-spring O to binding-post S, and thence back to the main line through negative conductor B'. Whenever the strength of the current in the main circuit exceeds the predetermined point, the force of the magnets K will overcome the spring $l$ and turn the armature L until it is thrown sufficiently to release the arm M, which is then immediately drawn away from its contact O and into the position indicated in dotted lines, breaking the main circuit, and by stopping the further production of current preventing any and all injury to the apparatus in circuit.

I do not limit myself to the exact construction or arrangement illustrated and described, nor do I limit myself to the precise methods of winding, arranging, and connecting the various circuits herein referred to, since various modifications, changes, and variations of arrangement necessary to adapt the system to particular conditions would suggest themselves and be readily applied by a person skilled in the art without in any way departing from the spirit of the invention.

Having described my invention, what I claim, and desire to secure by Letters Patent, is—

1. A system of generating and distributing electric currents, comprising a separately-excited generator of the continuous-current type, the armature of which is connected with the working circuit, an exciting-generator, also of the continuous-current type and having primary or main field-magnet coils and connected directly to and delivering its entire normal output through the field-magnet coils of the generator, magnetizing the same so as to produce the initial potential in its armature, and additional reinforcing-coils upon the field-magnet of the exciter, said coils forming part of the said working circuit and acting to increase or decrease the total output of the exciter and correspondingly affect the field of force of the main generator in accordance with the consumption of current in the working circuit.

2. In a system of generating and distributing electric currents, a main generator, the armature of which supplies current of constant potential to the main or working circuit, a separate exciter having primary or main field-magnet coils and connected in series with and delivering its total normal output through the field-magnet coils of the main generator, means for adjusting the normal output of the exciter to magnetize the said main field-magnet, so as to induce current of the initial potential in its armature, and additional reinforcing-coils upon the field-magnets of the exciter, said additional coils forming part of the main working circuit and arranged to automatically increase or decrease the total output of the exciter and thereby correspondingly affect the armature of the main generator, according to the consumption of current in the main circuit.

In testimony whereof I hereto affix my signature in presence of two witnesses.

CHARLES J. VAN DEPOELE.

Witnesses:
WILLIAM A. STILES,
W. A. KREIDLER.